United States Patent
Liaw

(10) Patent No.: US 9,746,082 B2
(45) Date of Patent: Aug. 29, 2017

(54) DUST-RESISTANT STRUCTURE FOR TOOLING MACHINE

(71) Applicant: X'POLE PRECISION TOOLS INC., Taoyuan (TW)

(72) Inventor: Yi-Jung Liaw, Taoyuan (TW)

(73) Assignee: X'POLE PRECISION TOOLS INC., Zhongli, Taoyuan County (TW)

( * ) Notice: Subject to any disclaimer, the term of this patent is extended or adjusted under 35 U.S.C. 154(b) by 109 days.

(21) Appl. No.: 14/989,344

(22) Filed: Jan. 6, 2016

(65) Prior Publication Data

US 2017/0159822 A1    Jun. 8, 2017

(30) Foreign Application Priority Data

Dec. 2, 2015    (TW) .............................. 104140411 A

(51) Int. Cl.
| | |
|---|---|
| *B24B 23/00* | (2006.01) |
| *F16J 15/3268* | (2016.01) |
| *B25F 5/02* | (2006.01) |
| *B24B 23/02* | (2006.01) |

(52) U.S. Cl.
CPC ........... *F16J 15/3268* (2013.01); *B24B 23/02* (2013.01); *B25F 5/02* (2013.01)

(58) Field of Classification Search
CPC .... F16J 15/3268; B24B 23/02; B24B 55/105; B25F 5/02
See application file for complete search history.

(56) References Cited

U.S. PATENT DOCUMENTS

| | | | | |
|---|---|---|---|---|
| 5,580,302 | A * | 12/1996 | Howard, Jr. .............. | B25F 5/02 451/357 |
| 5,941,765 | A * | 8/1999 | Taylor ..................... | B24B 23/03 451/357 |
| 6,257,970 | B1 * | 7/2001 | Huber ..................... | B24B 23/03 451/344 |

(Continued)

FOREIGN PATENT DOCUMENTS

| | | |
|---|---|---|
| TW | I267426 | 12/2006 |
| TW | 200838641 | 10/2008 |

*Primary Examiner* — Gilbert Lee
(74) *Attorney, Agent, or Firm* — Muncy, Geissler, Olds & Lowe, P.C.

(57) ABSTRACT

A dust-resistant structure for a tooling machine is disclosed. The tooling machine includes a front plate including an accommodation member and a shaft supporter disposed inside the accommodation member. The dust-resistant structure comprises a bridging ring, a dust-resistant rubber ring and a dust-resistant sealing cover. The bridging ring is disposed corresponding to the front plate, and includes a ring body, an inside-ring region corresponding to the accommodation member, and at least one pressure release member formed in the ring body and interconnecting with the inside-ring region for releasing pressure. The dust-resistant rubber ring is assembled to the ring body and disposed in the inside-region region with an inner rim contacting the accommodation member to block dust. The dust-resistant sealing cover includes a cover body assembled to and shielding the accommodation member for blocking dust; and an assembling hole formed in the cover body and penetrated by the dynamic module.

14 Claims, 6 Drawing Sheets

(56) References Cited

U.S. PATENT DOCUMENTS

2003/0129934 A1* 7/2003 Huber .................... B24B 23/03
                                                          451/357
2016/0121455 A1* 5/2016 Miller .................... F16B 7/042
                                                          451/453
2017/0125192 A1* 5/2017 Hanai .................... H01H 25/00

* cited by examiner

DUST-RESISTANT STRUCTURE FOR TOOLING MACHINE

FIELD OF THE INVENTION

The present invention relates to a dust-resistant structure for a tooling machine, particularly to a dust-resistant structure for an active portion of a tooling machine.

BACKGROUND OF THE INVENTION

The commonly-seen industrial tooling machines, such as grinders, are normally driven pneumatically or electrically, with dust generated in operation. In addition to affecting operation and polluting environment, dust may be sucked into the tooling machine and accumulated thereinside. In the long run, the accumulated dust would affect the function of the tooling machine. Therefore, some manufacturers have proposed technologies to solve the abovementioned problems, such as the technologies disclosed in Taiwan patent No. I267426 and Taiwan patent publication No. 200838641.

The Taiwan patent No. I267426 disclosed a grinder with a dust-resistant function, which comprises a body, a rotary shaft, a driving module, a bottom cover and a sealing element. The bottom of the body is concaved inward to form a space where the driving module is accommodated. The rotary shaft is vertically coupled to the driving module and driven by the driving module. The lower end of the rotary shaft has a plane facing downward. The bottom cover has a through-hole at the center thereof and covers the bottom of the body to seal the space. The rotary shaft is aligned exactly to the through-hole. The plane is greater than the through-hole and positioned above the top surface of the bottom cover. The sealing element is disposed between the plane and the top surface of the bottom cover to seal the gap between the plane and the bottom cover. Therefore, the patent of No. I267426 achieves the dust-resistant effect via the sealability between bottom cover and the bottom of the body and the airtightness between the plane and the bottom cover.

The Taiwan patent publication No. 200838641 disclosed a grinder with a dust-resistant effect, which comprises a housing, a pneumatic cylinder and a sealing cover assembly. The pneumatic cylinder is disposed inside the housing and has a cylinder body and a driving shaft rotatably passing through the cylinder body. The driving shaft has a first coupling member penetrating the cylinder body. The sealing cover assembly has at least one sealing cover disposed inside the housing and surrounding the first coupling member of the driving shaft. The sealing cover has at least one flow channel interconnecting with the cylinder body for exhausting the air flow, whereby the air flow is dispelled from the perimeter of the first coupling member of the driving shaft. Therefore, the patent of No. 200838641 uses the air flow dispelled from the perimeter of the first coupling member to blow away dust and thus promotes the rotation smoothness of the driving shaft.

Although the abovementioned patents respectively proposed their dust-resistant schemes for different tooling machines, they did not pay attention to the dust-resistant design of shaft supporters (such as bearings), which are critical in operation. Thus, dust still may accumulate in the shaft supporter and affect the operation thereof. Suppose a cover is disposed corresponding to a shaft supporter to make the shaft supporter located in an isolated space. The operating dynamic module of the tooling machine applies pressure to the shaft supporter. The pressure will be exhausted to the isolated space. However, the pressure would be trapped in the isolated space and hard to leak out therefrom. Thus, the pressure makes the shaft supporter unable to operate effectively. The trapped pressure is exactly the factor making the manufacturers unable to provide dust-resistant designs for shaft supporters.

Accordingly, the Inventors are eager to develop a technical scheme to solve the abovementioned problems.

SUMMARY OF THE INVENTION

The primary objective of the present invention is to solve the problem that the conventional technology is unable to provide a dust-resistant structure for shaft supporters.

To achieve the abovementioned objective, the present invention proposes a dust-resistant structure for a tooling machine. The tooling machine includes a front plate and a shaft supporter. The front plate is disposed on one side of a dynamic module, which faces a tool. The front plate has an accommodation member. The shaft supporter sleeves the dynamic module and is disposed inside the accommodation member. The dust-resistant structure comprises a bridging ring, a dust-resistant rubber ring, and a dust-resistant sealing cover. The bridging ring is disposed corresponding to the front plate, and has a ring body, an inside-ring region defined by the ring body and corresponding to the accommodation member, and at least one pressure release member formed in the ring body and interconnecting with the inside-ring region for releasing pressure, which is generated by the operating dynamic module and passes through the accommodation member to the inside-ring region. The dust-resistant rubber ring is assembled to the ring body and disposed in the inside-region region with an inner rim thereof contacting the accommodation member to block dust. The dust-resistant sealing cover has a cover body assembled to the accommodation member and shielding the accommodation member for blocking dust; and an assembling hole formed in the cover body and penetrated by the dynamic module for installing the dynamic module.

In one embodiment, the dust-resistant structure for a tooling machine further comprises at least one filtering element respectively disposed corresponding to the pressure release members for blocking dust from entering the inside-ring region.

In one embodiment, a plurality of the pressure release members is disposed in the bridging ring equidistantly.

In one embodiment, the bridging ring has a blocking rib protruding from the ring body to the inside-ring region for confining the dust-resistant rubber ring.

In one embodiment, the dust-resistant rubber ring has an assemblage portion assembled to the ring body, a connection portion extended from the assemblage portion and parallel to the bridging ring, and a dust-blocking portion extended from the connection portion to the accommodation member at a tilt angle.

In one embodiment, the dust-resistant rubber ring includes a hard substrate and a flexible body partially or completely wrapping the hard substrate.

In one embodiment, the dust-resistant sealing cover has a dust-resistant flange extended outward from the cover body.

In one embodiment, the dust-resistant flange is extended outward at another tilt angle, and the slope of the dust-resistant flange is different from the slope of the dust-blocking portion.

In one embodiment, the outer diameter of the accommodation member gradually shrinks stepwise from the front plate to the dust-resistant rubber ring.

In one embodiment, the dynamic module is connected with the tool through a counterweight member; the counterweight member has an installation socket and an auxiliary shaft supporter; the opening of the installation socket is formed on one side of the counterweight member, which is far away from the dynamic module; the auxiliary shaft supporter is disposed inside the installation socket; the dust-resistant structure further comprises a bridging rubber ring, a dust-blocking sealing cover and an installation axle; the dust-blocking sealing cover is disposed corresponding to the auxiliary shaft supporter and assembled to the bridging rubber ring for shielding the installation socket; the installation axle penetrates the auxiliary shaft supporter, the bridging rubber ring and the dust-blocking sealing cover and is fixed in the installation socket.

In one embodiment, the thickness of the auxiliary shaft supporter is greater than the thickness of the shaft supporter.

In one embodiment, the dust-blocking sealing cover has an assembly portion, which accommodates the bridging rubber ring and is penetrated by the installation axle; and a dust-blocking flange radiating from the assembly portion to shield the installation socket.

In one embodiment, the installation axle has an axle body, which penetrates the auxiliary shaft supporter, the bridging rubber ring and the dust-blocking sealing cover; and an assembly head, which is disposed at one end of the axle body and assembled to the dust-blocking sealing cover.

In one embodiment, the dust-resistant structure further comprises a dust-resistant gasket clamped by the front plate and the bridging ring.

Compared with the conventional technology, the present invention is characterized in that in addition to using the dust-resistant sealing cover to shield the shaft supporter, the dust-resistant structure of the present invention further blocks the assemblage gaps of all the assembled structures between the front plate and the bridging ring to resist dust from entering or accumulating in the abovementioned regions and exempt the tooling machine from malfunctions caused by dust. The present invention is further characterized in using the pressure release members to release the pressure generated by the operating dynamic module and passing through the accommodation member to the inside-ring region to prevent the dust-resistant sealing cover from being displaced inappropriately by the pressure and solve the problem that the conventional technology is unable to provide dust-resistant structure for shaft supporters.

DETAILED DESCRIPTION OF THE PREFERRED EMBODIMENTS

Figure 1:
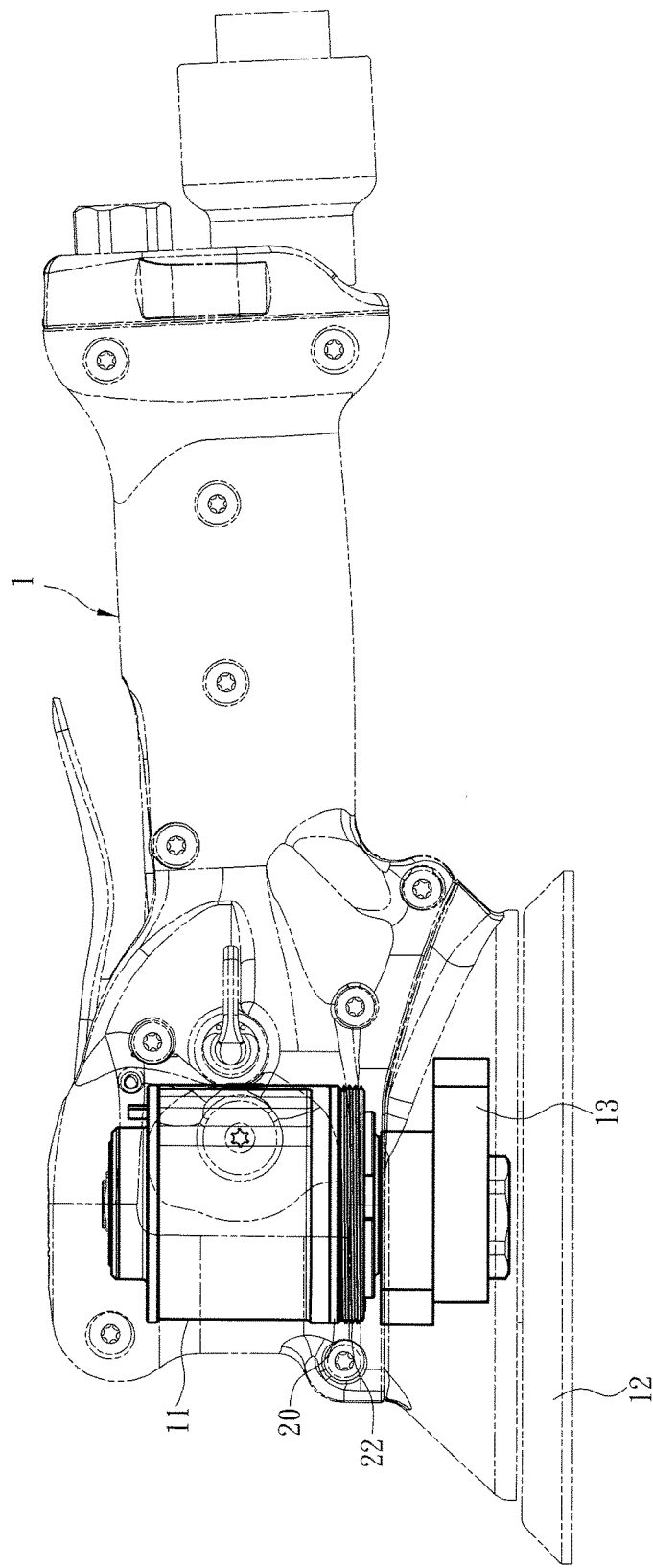
FIG. 1 is a sectional view schematically showing a tooling machine according to one embodiment of the present invention.
Figure 2:
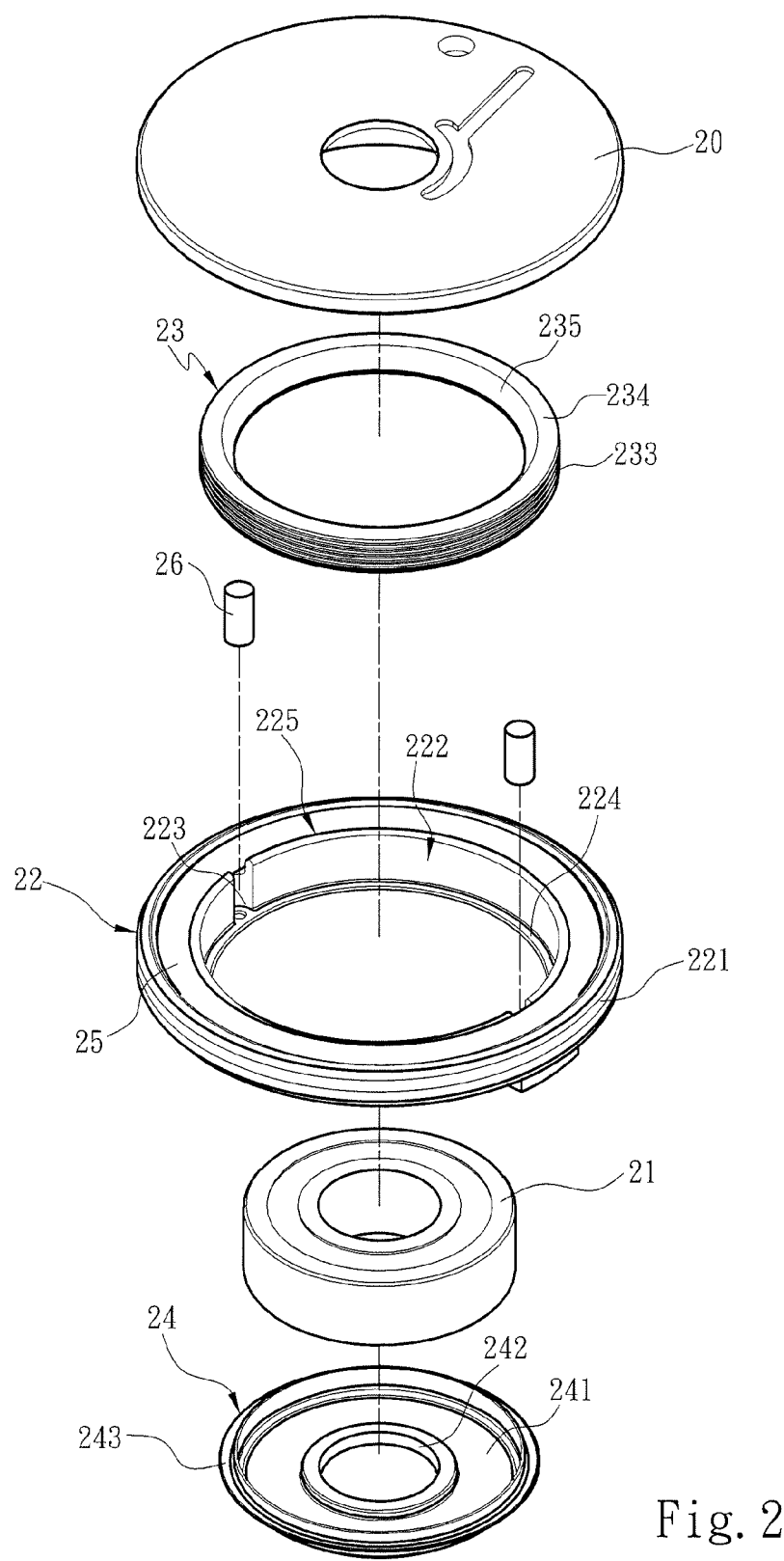
FIG. 2 is an exploded view schematically showing a dust-resistant structure according to one embodiment of the present invention.
Figure 3:
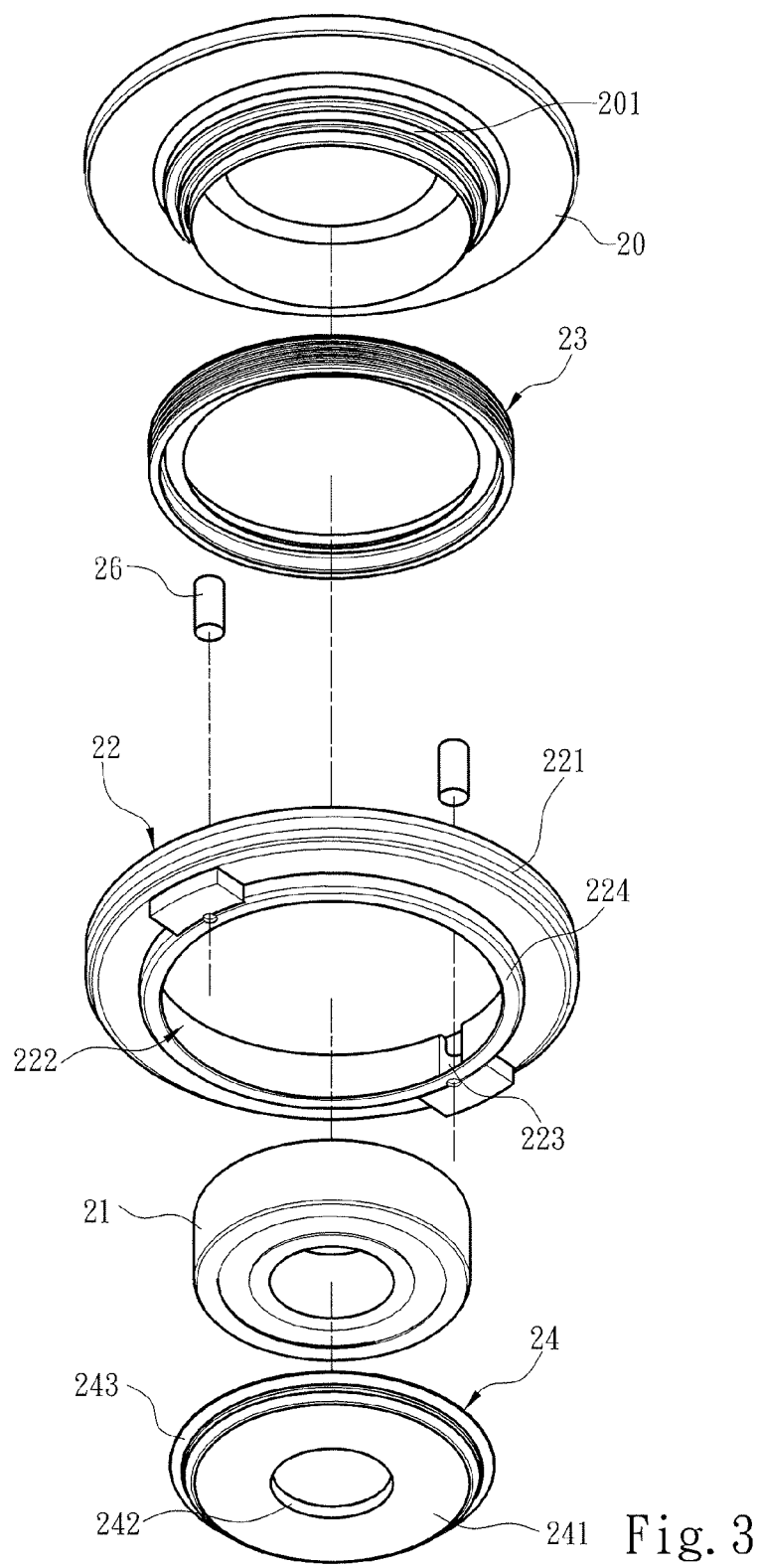
FIG. 3 is an exploded view taken from another viewing angle for schematically showing a dust-resistant structure according to one embodiment of the present invention.

The technical contents of the present invention will be described in detail in cooperation with drawings below.

Refer to FIGS. 1-6. The dust-resistant structure for a tooling machine of the present invention is directed to seal the active portion of a tooling machine 1, which may be an electric or pneumatic tooling machine. The present invention does not particularly limit the type of the tooling machine. Herein, a pneumatic tooling machine is used to exemplify the tooling machine and demonstrate the present invention. The tooling machine 1 comprises a dynamic module 11 and a tool 12 assembled to the dynamic module 11. In one embodiment, the dynamic module 11 is an assembly including a pneumatic turbine and an output shaft of the tooling machine 1. In the present invention, the tool 12 may be a grinding disc, a grinding wheel, or a cutting tool, etc., which is dependent on requirement of the task. For example, while intending to undertake grinding, the user should assemble a grinding disc to the dynamic module 11. The active portion of the tooling machine 1 mentioned in the specification is referred to the joint region between the dynamic module 11 and the tool 12.

The tooling machine 1 includes a front plate 20 and a shaft supporter 21. The front plate 20 is disposed on one side of the dynamic module 11, which faces the tool 12. The front plate 20 has an accommodation member 201, and the dynamic module 11 penetrates the accommodation member 201. The accommodation member 201 is a protrudent ring-like structure, having an inner diameter identical to the outer diameter of the shaft supporter 21. After the shaft supporter 21 is assembled to the accommodation member 201, the shaft supporter 21 is tightly engaged with the accommodation member 201. The shaft supporter 21 sleeves the dynamic module 11 and then is installed inside the accommodation member 201, whereby the shaft supporter 21 can assist in the rotation of the output shaft. In one embodiment, the shaft supporter 21 is a bearing.

Figure 4:
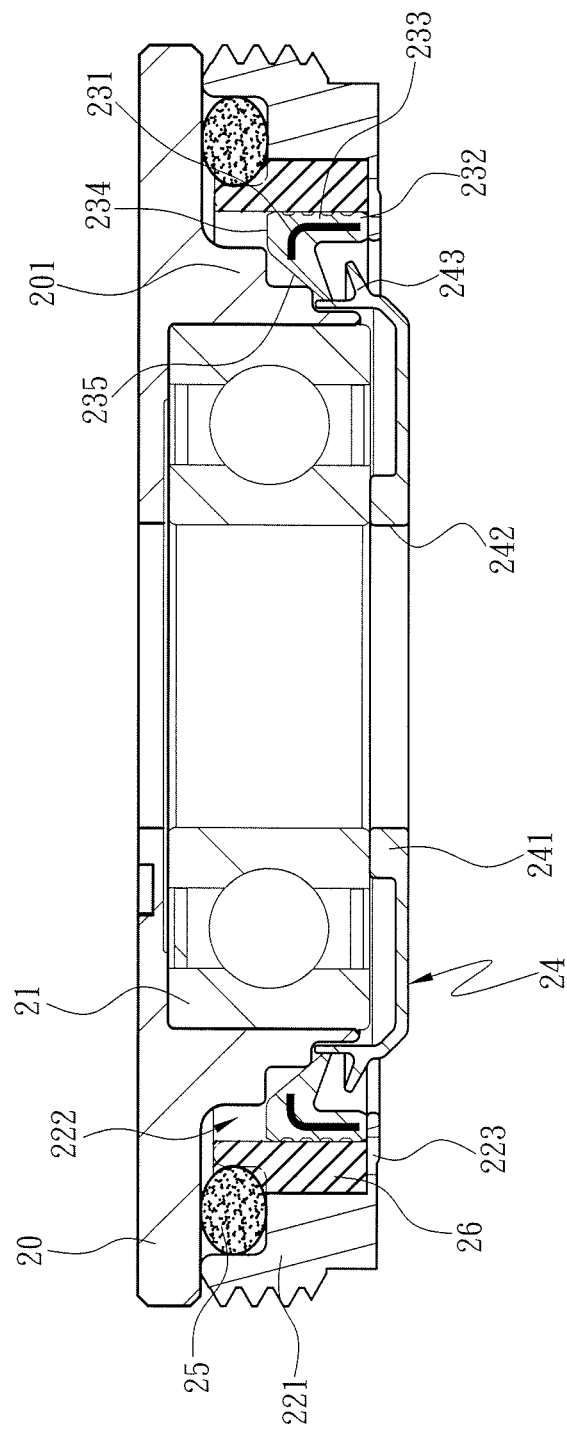
FIG. 4 is a sectional view schematically showing a local area of a dust-resistant structure according to one embodiment of the present invention.

The dust-resistant structure of the present invention comprises a bridging ring 22, a dust-resistant rubber ring 23, and a dust-resistant sealing cover 24. The bridging ring 22 is disposed corresponding to the front plate 20. The bridging ring 22 has a ring body 221, an inside-ring region 222 defined by the ring body 221 and corresponding to the accommodation member 201, and at least one pressure release member 223 formed in the ring body 221 and interconnecting with the inside-ring region 222. The pressure release member 223 releases pressure 51 generated by the dynamic module 11 and passing through the accommodation member 201 to the inside-ring region 222. In one embodiment, the pressure release member 223 is a cut groove formed in the ring body 221 and penetrating the ring body 221. The present invention does not particularly limit that the pressure release member 223 must be in the form depicted on the drawings but allows the form of the pressure release member 223 to vary according to requirement. In one embodiment, the bridging ring 22 further comprises a blocking rib 224 protruding from the ring body 221 to the inside-ring region 222 for confining the dust-resistant rubber ring 23. The blocking rib 224 is disposed along the ring body 221 and surrounds the inside-ring region 222. In order to guarantee the effect of the pressure release member 223, the pressure release member 223 further penetrates the blocking rib 224. In one embodiment, the pressure release member 223 includes a cut groove and a through-hole. Refer to FIG. 4. In one embodiment, the outer diameter of the accommodation member 201 gradually shrinks stepwise from the front plate 20 to a dust-resistant rubber ring 23. After the front plate 20 is assembled to a bridging ring 22, the accommodation member 201 cooperates with the dust-resistant rubber ring 23 and a dust-resistant sealing cover 24 to enhance the dust-resistant effect.

The dust-resistant rubber ring 23 is assembled to the ring body 221 and disposed in the inside-ring region 222. The outer rim of the dust-resistant rubber ring 23 tightly contacts the ring body 221, and the inner rim of the dust-resistant rubber ring 23 contacts the accommodation member 201 to protect against dust 50 generated by the tooling machine 1. Refer to FIG. 4. In one embodiment, the dust-resistant rubber ring 23 includes a hard substrate 231 and a flexible body 232 partially or completely wrapping the hard substrate 231. The flexible body 232 is made of a material able to deform appropriately, such as a rubber material or a plastic material. In the present invention, a portion of the flexible body 232 is used as the inner rim of the dust-resistant rubber ring 23. The deformability of the flexible body 232 can solve the problem of the dimensional variance of the components. Thereby, the flexible body 232 can indeed contact the accommodation member 201 and prevent the dust 50 from entering the tooling machine 1. Besides, the dust-resistant sealing cover 24 includes a cover body 241 and an assembling hole 242. The cover body 241 is assembled to the accommodation member 201, shielding the accommodation member 201 and protecting against the dust 50. The assembling hole 242 is formed in the cover body 241 and penetrated by the dynamic module 11 for installing the dynamic module 11. In one embodiment, the dust-resistant structure further comprises a dust-resistant gasket 25 clamped by the front plate 20 and the bridging ring 22. In one embodiment, the bridging ring 22 includes an assembling groove 225 receiving the dust-resistant gasket 25.

Refer to FIGS. 1-6. In the present invention, the front plate 20, the shaft supporter 21, the bridging ring 22, the dust-resistant rubber ring 23 and the dust-resistant sealing cover 24 are assembled in sequence. While the tooling machine 1 is operating, a working gas drives the dynamic module 11 to rotate the tool 12. Meanwhile, the dust 50 generated by the tooling machine 1 may enter the tooling machine 1. In the present invention, as the shaft supporter 21 is shielded by the dust-resistant sealing cover 24, the dust 50 is unlikely to accumulate in the shaft supporter 21. Further, the dust-resistant structure of the present invention also seals all the assemblage gaps of the assembled structure, which appear between the front plate 20 and the bridging ring 22, whereby the dust 50 is unlikely to enter the tooling machine 1. Thus, the present invention can really achieve the dust-resistant effect. Furthermore, the present invention uses the pressure release member 223 of the bridging ring 22 to release the pressure 51 generated by the dynamic module 11 and passing through the accommodation member 201 to the inside-ring region 222 lest the pressure 51 cause inappropriate displacement of the dust-resistant sealing cover 24.

Refer to FIGS. 1-6. In one embodiment, the dust-resistant structure of the present invention further comprises at least one filtering element 26 respectively disposed corresponding to the pressure release members 223 for blocking the dust from entering the inside-ring region 222. In one embodiment, the filtering element 26 is a piece of cotton or sponge. The filtering element 26 filters out the dust 50 lest it enter the inside-ring region 222. The filtering element 26 allows the gas in the inside-ring region 222 to pass and thus releases the pressure 51 of the inside-ring region 222. In one embodiment, a plurality of the pressure release members 223 is disposed in the bridging ring 22 equidistantly. In other words, the pressure release members 223 are uniformly disposed on the circumference of the ring body 221.

Refer to FIG. 4 again. The dust-resistant rubber ring 23 includes an assemblage portion 233 assembled to the ring body 221, a connection portion 234 extended from the assemblage portion 233 and parallel to the bridging ring 22, and a dust-blocking portion 235 extended from the connection portion 234 to the accommodation member 201 at a tilt angle. The dust-resistant sealing cover 24 includes a dust-resistant flange 243 extended outward from the cover body 241. The dust-resistant flange 243 is extended outward at another tilt angle. The slope of the dust-resistant flange 243 is different from the slope of the dust-blocking portion 235. Via the dust-resistant flange 243 and the dust-blocking portion 235, dust is more effectively blocked from entering the inside-ring region 222.

Figure 5:
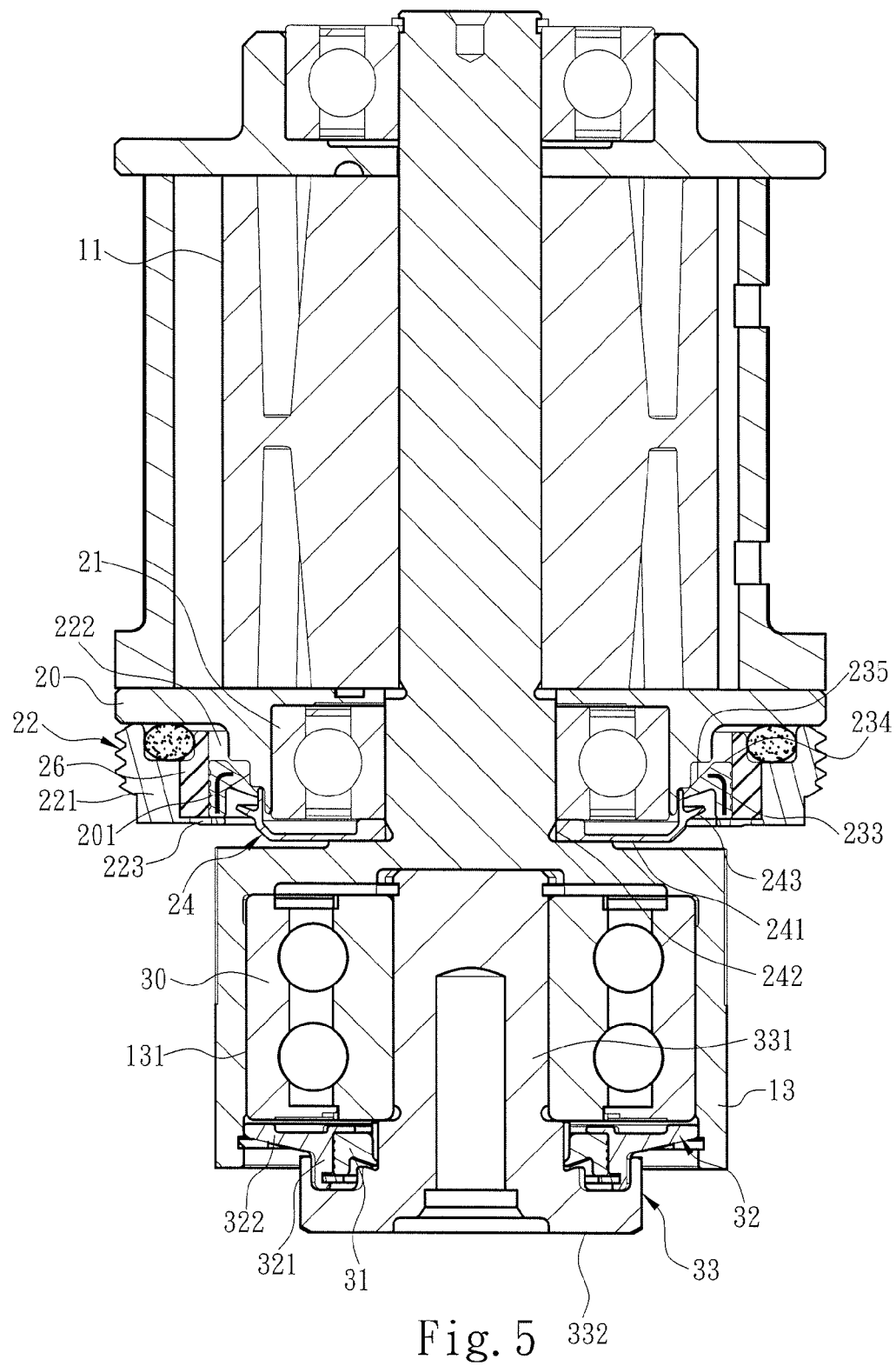
FIG. 5 is a sectional view schematically showing a local region of a tooling machine according to one embodiment of the present invention.
Figure 6:
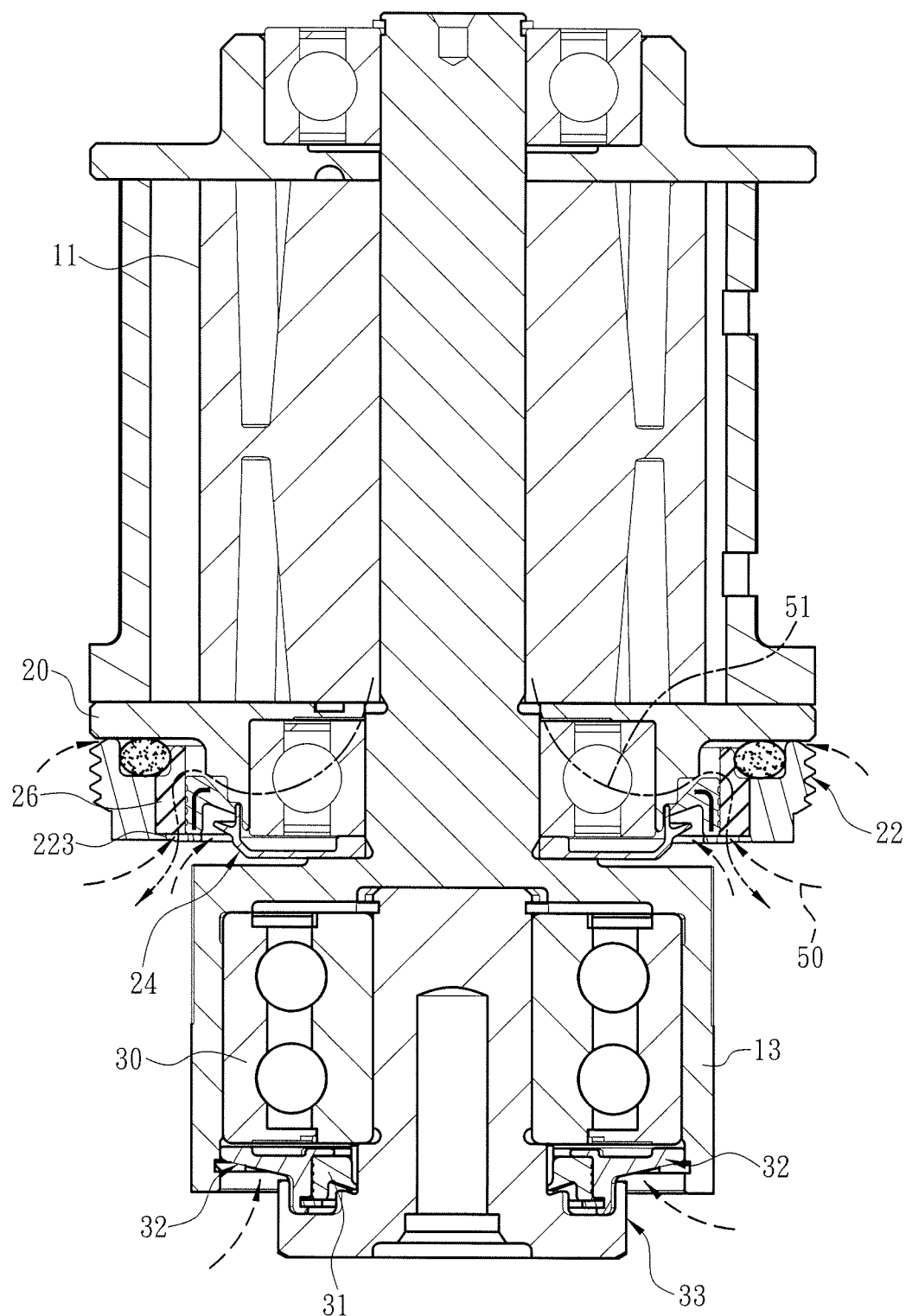
FIG. 6 is a diagram schematically showing an embodiment of the present invention.

Refer to FIG. 1 and FIG. 5. In one embodiment, the dynamic module 11 is connected with the tool 12 through a counterweight member 13. The counterweight member 13 includes an installation socket 131 and an auxiliary shaft supporter 30. The opening of the installation socket 131 is formed on one side of the counterweight member 13, which is far away from the dynamic module 11. The auxiliary shaft supporter 30 is disposed inside the installation socket 131. In one embodiment, the dust-resistant structure of the present invention further comprises a bridging rubber ring 31, a dust-blocking sealing cover 32 and an installation axle 33. In one embodiment, the auxiliary shaft supporter 30 is a bearing. The dust-blocking sealing cover 32 is disposed corresponding to the auxiliary shaft supporter 30 and assembled to the bridging rubber ring 31 for shielding the installation socket 131. The installation axle 33 penetrates the auxiliary shaft supporter 30, the bridging rubber ring 31 and the dust-blocking sealing cover 32 and is fixed in the installation socket 131. In one embodiment, the thickness of the auxiliary shaft supporter 30 is greater than the thickness of the shaft supporter 21. In one embodiment, the bridging rubber ring 31 is realized by the structure of the dust-resistant rubber ring 23. The details of the dust-resistant rubber ring 23 have been described above and will not repeat herein. In one embodiment, the dust-blocking sealing cover 32 includes an assembly portion 321, which accommodates the bridging rubber ring 31 and is penetrated by the installation axle 33; and a dust-blocking flange 322 radiating from the assembly portion 321 to shield the installation socket 131. In one embodiment, the installation axle 33 includes an axle body 331, which penetrates the auxiliary shaft supporter 30, the bridging rubber ring 31 and the dust-blocking sealing cover 32; and an assembly head 332, which is disposed at one end of the axle body 331 and assembled to the dust-blocking sealing cover 32. In assemblage, the dust-blocking sealing cover 32 and the bridging rubber ring 31 are sequentially assembled to the installation axle 33 beforehand; next the auxiliary shaft supporter 30 sleeves the installation axle 33 to form a shaft assembly; then the shaft assembly is installed inside the installation socket 131. Thus, the dust-blocking sealing cover 32 can prevent the dust 50 from entering the installation socket 131.

What is claimed is:
1. A dust-resistant structure for a tooling machine, wherein the tooling machine includes a front plate and a shaft supporter, and wherein the front plate is disposed on one side of a dynamic module, which faces a tool, and includes an accommodation member, and wherein the shaft supporter sleeves the dynamic module and is disposed inside the accommodation member, and wherein the dust-resistant structure comprises
- a bridging ring disposed corresponding to the front plate, including a ring body, an inside-ring region defined by the ring body and corresponding to the accommodation member, and at least one pressure release member formed in the ring body and interconnecting with the inside-ring region for releasing pressure generated by the operating dynamic module and passing through the accommodation member to the inside-ring region;
- a dust-resistant rubber ring assembled to the ring body and disposed in the inside-region region, wherein an inner rim of the dust-resistant rubber ring contacts the accommodation member to protect against dust; and
- a dust-resistant sealing cover including a cover body and an assembling hole, wherein the cover body is assembled to the accommodation member, shielding the accommodation member and protecting against the dust, and wherein the assembling hole is formed in the cover body and penetrated by the dynamic module for installing the dynamic module.

2. The dust-resistant structure for a tooling machine according to claim 1 further comprising at least one filtering element respectively disposed corresponding to the pressure release members for blocking the dust from entering the inside-ring region.

3. The dust-resistant structure for a tooling machine according to claim 2, wherein a plurality of the pressure release members is disposed in the bridging ring equidistantly.

4. The dust-resistant structure for a tooling machine according to claim 3, wherein the bridging ring further includes a blocking rib protruding from the ring body to the inside-ring region for confining the dust-resistant rubber ring.

5. The dust-resistant structure for a tooling machine according to claim 3, wherein the dust-resistant rubber ring includes an assemblage portion assembled to the ring body, a connection portion extended from the assemblage portion and parallel to the bridging ring, and a dust-blocking portion extended from the connection portion to the accommodation member) at a tilt angle.

6. The dust-resistant structure for a tooling machine according to claim 5, wherein the dust-resistant rubber ring includes a hard substrate and a flexible body partially or completely wrapping the hard substrate.

7. The dust-resistant structure for a tooling machine according to claim 5, wherein the dust-resistant sealing cover includes a dust-resistant flange extended outward from the cover body.

8. The dust-resistant structure for a tooling machine according to claim 7, wherein the dust-resistant flange is extended outward at another tilt angle, and wherein a slope of the dust-resistant flange is different from a slope of the dust-blocking portion.

9. The dust-resistant structure for a tooling machine according to claim 3, wherein an outer diameter of the accommodation member gradually shrinks stepwise from the front plate to the dust-resistant rubber ring.

10. The dust-resistant structure for a tooling machine according to claim 9, wherein the dynamic module is connected with the tool through a counterweight member, and wherein the counterweight member includes an installation socket and an auxiliary shaft supporter, and wherein an opening of the installation socket is formed on one side of the counterweight member, which is far away from the dynamic module, and wherein the auxiliary shaft supporter is disposed inside the installation socket, and wherein the dust-resistant structure further comprises a bridging rubber ring, a dust-blocking sealing cover and an installation axle, and wherein the dust-blocking sealing cover is disposed corresponding to the auxiliary shaft supporter and assembled to the bridging rubber ring for shielding the installation socket, and wherein the installation axle penetrates the auxiliary shaft supporter, the bridging rubber ring and the dust-blocking sealing cover and is fixed in the installation socket.

11. The dust-resistant structure for a tooling machine according to claim 10, wherein the thickness of the auxiliary shaft supporter is greater than the thickness of the shaft supporter.

12. The dust-resistant structure for a tooling machine according to claim 10, wherein the dust-blocking sealing cover includes an assembly portion, which accommodates the bridging rubber ring and is penetrated by the installation axle; and a dust-blocking flange radiating from the assembly portion to shield the installation socket.

13. The dust-resistant structure for a tooling machine according to claim 12, wherein the installation axle includes an axle body, which penetrates the auxiliary shaft supporter, the bridging rubber ring and the dust-blocking sealing cover; and an assembly head, which is disposed at one end of the axle body and assembled to the dust-blocking sealing cover.

14. The dust-resistant structure for a tooling machine according to claim 1 further comprising a dust-resistant gasket clamped by the front plate and the bridging ring.

\* \* \* \* \*